United States Patent
Bokich

(10) Patent No.: US 7,828,542 B2
(45) Date of Patent: Nov. 9, 2010

(54) POSITIONING DEVICE WITH BEARING MECHANISM

(75) Inventor: Michael S. Bokich, El Paso, TX (US)

(73) Assignee: Extreme Components LP, El Paso, TX (US)

( * ) Notice: Subject to any disclaimer, the term of this patent is extended or adjusted under 35 U.S.C. 154(b) by 0 days.

(21) Appl. No.: 12/396,225

(22) Filed: Mar. 2, 2009

(65) Prior Publication Data

US 2009/0220631 A1    Sep. 3, 2009

Related U.S. Application Data

(60) Provisional application No. 61/032,756, filed on Feb. 29, 2008.

(51) Int. Cl.
*B29C 33/20* (2006.01)

(52) U.S. Cl. .............. 425/190; 425/192 R; 425/451.9; 425/472

(58) Field of Classification Search ............. 425/190, 425/192 R, 451.9, 472, 595
See application file for complete search history.

(56) References Cited

U.S. PATENT DOCUMENTS

| | | | |
|---|---|---|---|
| 2,422,775 A | | 6/1947 | Conner |
| 2,846,278 A | | 8/1958 | Blazek |
| 4,003,283 A | | 1/1977 | Janiszewski |
| 4,520,991 A | * | 6/1985 | Letica .................. 249/122 |
| 4,678,158 A | | 7/1987 | Brock |
| 4,750,876 A | | 6/1988 | Lawson |
| 5,490,317 A | | 2/1996 | Kubert |
| 5,762,977 A | | 6/1998 | Boskovic |
| 6,558,145 B2 | | 5/2003 | Wieder |
| 6,921,256 B2 | | 7/2005 | Bokich |
| 6,953,331 B2 | | 10/2005 | Bokich |
| 6,981,858 B2 | * | 1/2006 | Wieder .................. 425/190 |

FOREIGN PATENT DOCUMENTS

JP    2001-353728 A    12/2001

OTHER PUBLICATIONS

English Language Abstract for Japanese Patent Publication No. 2001-353728 A, published Dec. 25, 2001, extracted from espacenet.corn database on Jun. 14, 2010, 1 page.

\* cited by examiner

*Primary Examiner*—James Mackey
(74) *Attorney, Agent, or Firm*—Howard & Howard Attorneys PLLC

(57) ABSTRACT

A positioning device includes a first member and a second member. The first member defines an alignment axis and has a male portion. The second member is separable from the first member and defines a female portion for mating with the male portion along the alignment axis. A bearing mechanism is coupled to the female portion for reducing friction when the male and female portions mate and the bearing mechanism moves between first and second positions relative to at least one of the members. A resilient member is retained by the second member for resiliently supporting the bearing mechanism between the first and second positions. A retaining pin is coupled to the bearing mechanism and is retained between the second member and the resilient member. The retaining pin reacts against the resilient member as the bearing mechanism moves between the first and second positions.

32 Claims, 8 Drawing Sheets

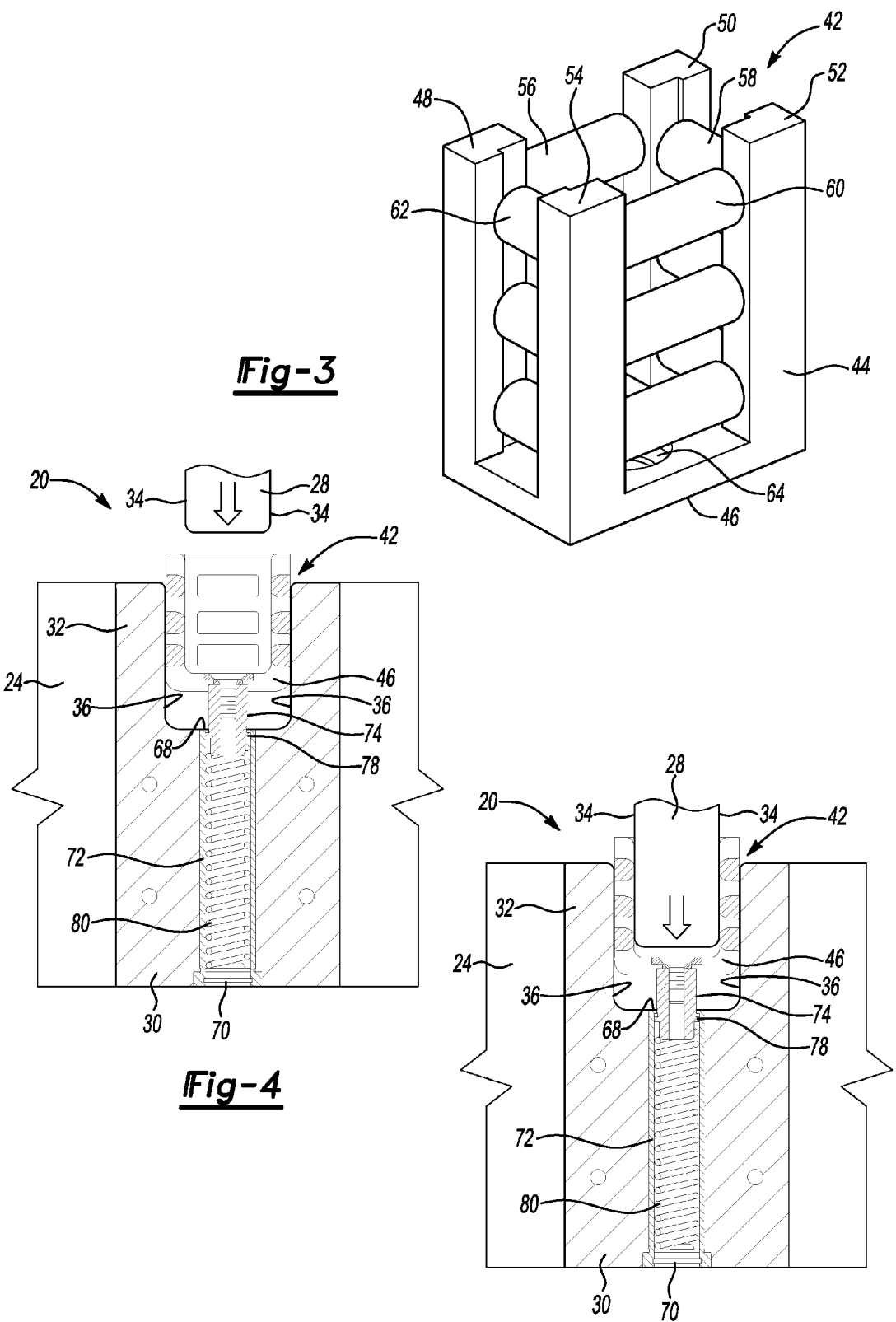

POSITIONING DEVICE WITH BEARING MECHANISM

CROSS-REFERENCE TO RELATED APPLICATIONS

The subject patent application claims priority to and all the benefits of U.S. Provisional Patent Application Ser. No. 61/032,756 which was filed on Feb. 29, 2008, the entire specification of which is expressly incorporated herein by reference.

BACKGROUND OF THE INVENTION

1. Field of the Invention

The present invention relates to a positioning device for aligning and guiding two halves of a mold together. More specifically, the present invention relates to the positioning device having a bearing mechanism to facilitate aligning and guiding the two halves while reducing wear of the positioning device.

2. Description of the Related Art

In a typical molding process, two halves of a mold are closed together to define a cavity and material is injected into the cavity to form a product. During the molding process, the two halves are repeatedly opened and closed to form multiple products. Molding processes are used in many industries. In many of these industries, the products being formed must meet rigorous standards and specifications. Hence, the tolerance for misalignment between the mold halves during the molding process is generally small.

Positioning devices are used to reduce tolerances between the mold halves to form products that meet the appropriate standards and specifications for each industry. A typical positioning device comprises a first member attached to one of the mold halves and a second member attached to the other mold half. The first member has a male portion that engages a female portion of the second member when the mold halves are closed together.

The fit between the male and female portions of the members determines the magnitude of misalignment between the mold halves. In prior art positioning devices, the male portion includes a first pair of bearing surfaces and the female portion includes a second pair of bearing surfaces. The bearing surfaces of the male portion slide against the bearing surfaces of the female portion to provide a better fit when aligning and guiding the mold halves together. As a result, these bearing surfaces are susceptible to wear. Consequently, as demand for higher productivity increases, the speed of the molding process increases thereby increasing the wear along the bearing surfaces of prior art positioning devices.

Traditionally, when the bearing surfaces became worn, the positioning devices must be replaced in order to maintain proper tolerances. This results in increased cost and unacceptable delays in production. There remains opportunity to improve the positioning device in order to properly align the two halves of the mold while also extending the life of the positioning device.

SUMMARY OF THE INVENTION AND ADVANTAGES

The present invention includes a positioning device for aligning and guiding first and second mold halves together. The positioning device comprises a first member defining an alignment axis and having a male portion and a second member separable from the first member and defining a female portion for mating with the male portion along the alignment axis. A bearing mechanism is coupled to at least one of the male and female portions for reducing friction when the male and female portions mate and the bearing mechanism moves between first and second positions relative to at least one of the members. A resilient member is retained by one of the first and second members for resiliently supporting the bearing mechanism between the first and second positions. A retainer is coupled to the bearing mechanism and is retained between the one of the first and second members and the resilient member for reacting against the resilient member as the bearing mechanism moves between the first and second positions.

The positioning device of the present invention provides several advantages over the prior art. In particular, by allowing the bearing mechanism to move between first and second positions relative to at least one of the members when the members mate together, the amount of wear along the bearing surfaces is substantially reduced thereby significantly increasing the cycles of operation for the positioning device. This results in less down time and increased productivity. At the same time, the magnitude of potential misalignment between the mold halves is sustained at no more than a negligible level. In addition, having the resilient member retained by one of the first and second members and the bearing mechanism retained between the resilient member and the one of the first and second members leads to a more compact positioning device.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is an assembly view of a cage of a bearing mechanism of the positioning device;

FIG. 4 is a partially cut-away elevational view of the positioning device with the bearing mechanism in a first position;

FIG. 5 is a partially cut-away elevational view of the positioning device with the bearing mechanism between the first and second positions as a first member of the positioning device mates with a second member of the positioning device;

DETAILED DESCRIPTION OF THE INVENTION

Referring to the Figures, wherein like numerals indicate like parts throughout the several views, a positioning device for aligning and guiding first and second mold halves 22, 24 together is generally shown at 20. The mold halves 22, 24 could be used in injection molding processes, metal stamping processes, or any other forming process in which alignment between two portions is required for operation. In a typical molding operation, several of the positioning devices may be used to align and guide the first and second mold halves 22, 24 together.

The positioning device 20 of the present invention can be embodied in several types of well-known locking systems. For purposes of illustration, the positioning device 20 are shown as cavity and core locks (FIG. 1), side locks (FIG. 8), top locks (FIG. 9), and x-type side locks (FIG. 10). These types of locking systems are well known to those skilled in the art for aligning first and second mold halves 22, 24 together. However, as a starting point, those features of the positioning device that are common to each locking system are first described. Also, it should be appreciated that the positioning device 20 can be used in any type of locking system for aligning first and second mold halves 22, 24 without departing from the nature of the present invention.

Figure 1:
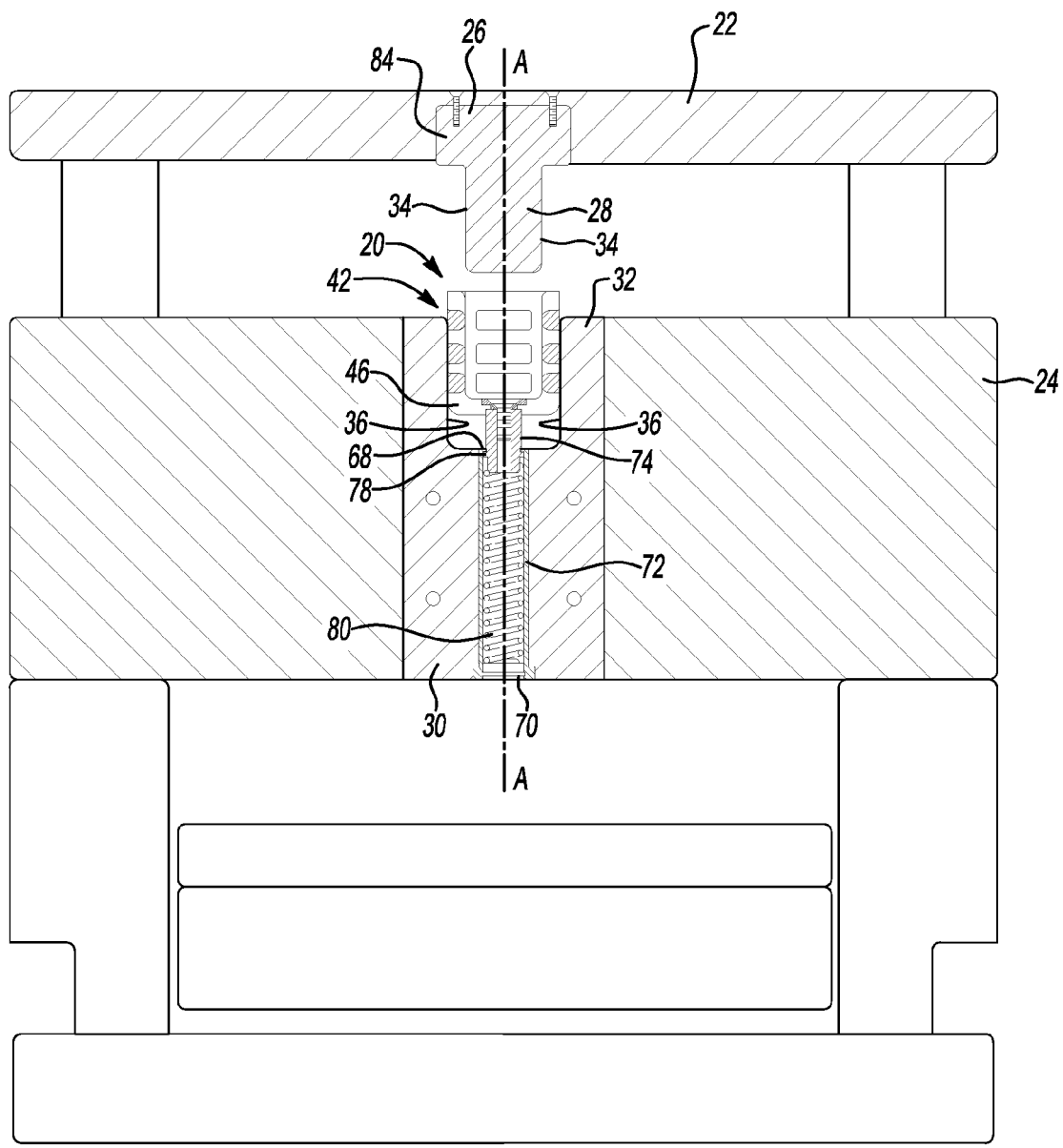
FIG. 1 is a cross-sectional view of first and second mold halves showing a positioning device therebetween.
Figure 2:
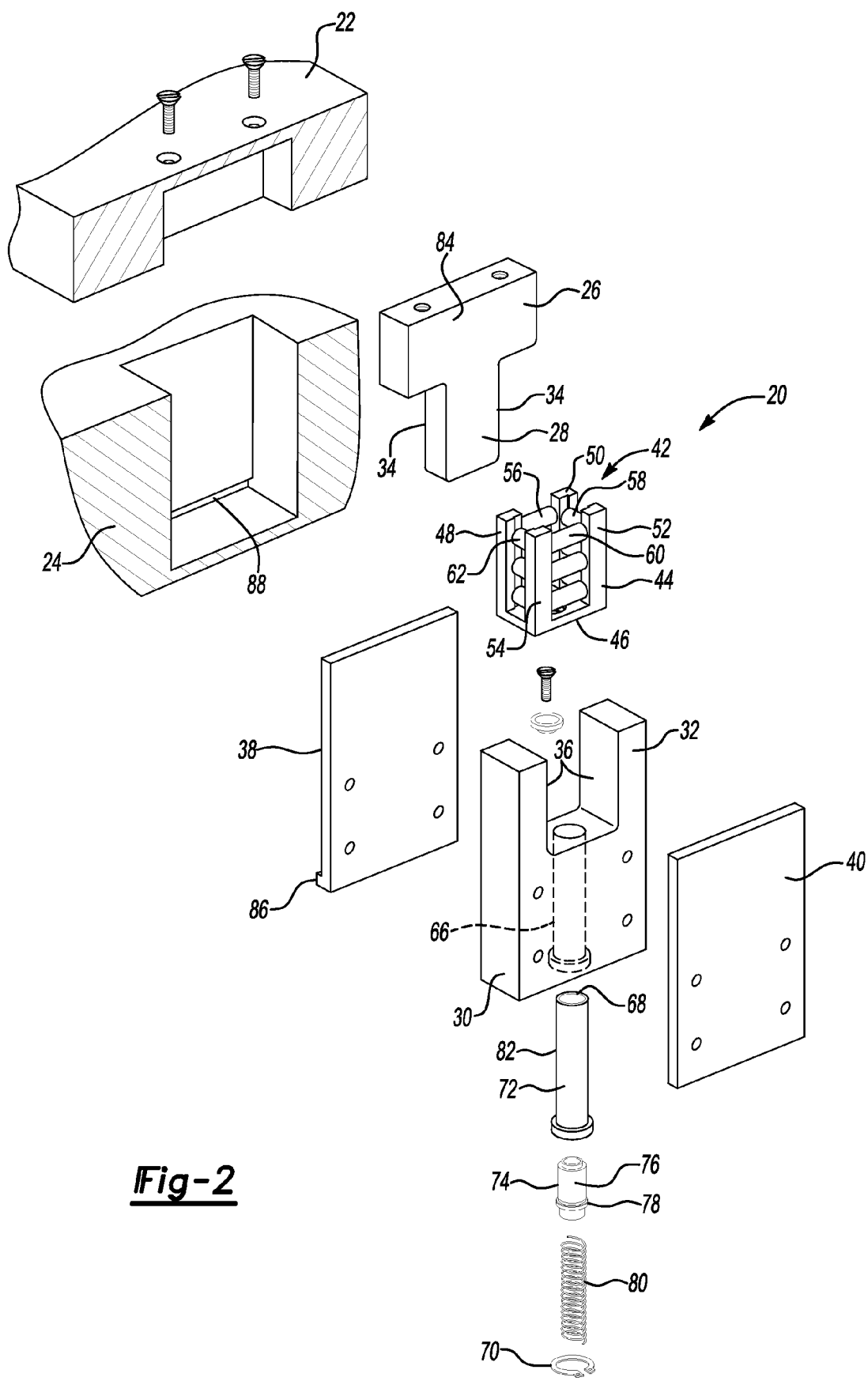
FIG. 2 is an exploded view of the positioning device.

Referring to FIGS. 1 and 2, the positioning device 20 includes a first member 26 defining an alignment axis A and having a male portion 28. The first member 26 is mounted to the first mold half 22. A second member 30 is separable from the first member 26 and defines a female portion 32 for mating with the male portion 28 along the alignment axis A to align the first and second mold halves 22, 24 together. The second member 30 is mounted to the second mold half 24. The male portion 28 presents a first pair of bearing surfaces 34 and the female portion 32 presents a second pair of bearing surfaces 36. The first and second members 26, 30 are typically made from hardened tool steel.

The second member 30 typically includes a first plate 38 and a second plate 40 with the female portion 32 sandwiched between the first and second plates 38, 40. The first and second plates 38, 40 and the female portion 32 create a pocket to receive other components described below. This pocket protects these other components from dirt, debris, etc., as well as from inadvertent impact from other components. The first and second plates 38, 40 are typically attached to the female portion 32 with screws. It should be appreciated that the second member 30 can be formed as a single piece without departing from the nature of the present invention.

A bearing mechanism 42 is coupled to at least one of the male and female portions 28, 32. The bearing mechanism 42 reduces friction between the male and female portions 28, 32 when the male and female portions 28, 32 mate along the alignment axis A and the bearing mechanism 42 moves between first and second positions relative to at least one of the members 26, 30. As set forth in further detail below, the bearing mechanism 42 is shown in the first position in FIG. 4 and is shown in the second position in FIG. 5.

Referring to FIG. 3, the bearing mechanism 42 includes a cage 44 defining a cavity for receiving the male portion 28 of the first member 26. The cage 44 has a bottom wall 46, a first column 48, a second column 50, a third column 52, and a fourth column 54 each extending from the bottom wall 46. The columns 48, 50, 52, 54 are spaced from and parallel to each other.

A first needle bearing 56 is rotatably supported between the first and second columns 48, 50; a second needle 58 bearing is rotatably supported between the second and third columns 58, 60; a third needle bearing 60 is rotatably supported between the third and fourth columns 52, 54; and a fourth needle bearing 62 is rotatably supported between the first and fourth columns 48, 54. As best shown in FIG. 3, typically, a plurality of needle bearings are rotatably supported between each of the first and second columns 48, 50, the second and third columns 50, 52, the third and fourth columns 52, 54, and the first and fourth columns 48, 54. It should be appreciated that the needle bearings 56, 58, 60, 62 are shown in the Figures for exemplary purposes and the bearing mechanism 42 can include any type of bearing in the place of or in addition to the needle bearings 56, 58, 60, 62 without departing from the nature of the present invention.

The columns 48, 50, 52, 54 and needle bearings 56, 58, 60, 62 define the cavity for receiving the male portion 28 of the first member 26. The cavity is surrounded by the columns 48, 50, 52, 54 and the needle bearings 56, 58, 60, 62. In other words, the combination of the columns 48, 50, 52, 54 and the needle bearings 56, 58, 60, 62 extend continuously around the cavity, i.e., along all four sides of the cavity, to align the male portion 28 in two directions, as discussed further below. When the bearing mechanism 42 receives the male portion 28, four bearing surfaces 34 of the male portion 28 contact and roll along the bearing mechanism, i.e., the four bearing surfaces contact and roll along the needle bearings 56, 58, 60, 62, respectively.

Each of the needle bearings 56, 58, 60, 62 includes pins on opposing ends thereof. The pins engage recesses defined in the respective columns 48, 50, 52, 54. The recesses typically do not extend entirely through the columns 48, 50, 52, 54 to avoid weakening the cage 44. Instead, the recesses act as pockets for rotatably supporting the pins. The first and third needle bearings 56, 58 are spaced from each other equidistant from the alignment axis A and the second and fourth needle bearings 58, 62 are spaced from each other equidistant from the alignment axis A.

The bearing mechanism 42 receives the male portion 28 to align the first and second mold halves 22, 24 together in all directions, i.e., the x, y, and z directions. Specifically, the columns 48, 50, 52, 54 and needle bearings 56, 58, 60, 62 align the mold halves 22, 24 in two directions and the bottom wall 46 of the cage 44 aligns the mold halves 22, 24 in the third direction when the bottom wall 46 abuts the female portion 32.

In the Figures, the cavity defined by the cage 44 is rectangular to correspond with the rectangular cross-section of the male portion 28. It should be appreciated that the cage 44 can be designed to have a cavity of a different shape to accept a male portion 28 having a different cross-sectional shape. In any event, the bearing mechanism 42 is sized and shaped to receive the male portion 28 to align the first and second mold halves 22, 24 relative to each other in all directions.

To manufacture the cage 44, the cage 44 can be formed of a plurality of components that are separately formed and subsequently welded together. This sandwiches the needle bearings for rotatable support within the recesses and between the respective columns. Typically, the bottom wall 46 of the cage 44 is then bore 66d with a chamfered bore 66 64.

Alternatively, the cage 44 can be over-molded onto the needle bearings 48, 50, 52, 54 using processes well known to those skilled in the injection molding arts. In this instance, steel inserts (not shown) could be added to fortify the recesses.

As appreciated by those skilled in the art, the cage 44 may be formed from, for example, metal or plastic. For example, such a metal could be steel or aluminum. It should be appreciated that the cage can be formed of any sort of rigid material suitable to such a use without departing from the nature of the present invention. Typically the male portion 28 is wider than the cage 44 and slightly expands the cage 44 upon insertion of the male portion 28 into the cage 44 to eliminate a loose fit between the male portion 28 and the cage 44 to ensure proper alignment between the first and second mold halves 22, 24. It should be appreciated that the cage 44 can include reinforcement walls (not shown) that extend generally parallel to the needle bearings 48, 50, 52, 54 between the respective columns to selectively fortify the cage 44 in certain applications.

One of the first and second members 26, 30 defines a bore 66. In FIGS. 1-6 and 8-10, the second member 30 defines the bore 66. Alternatively, as shown in FIG. 7, the first member 26 defines the bore 66. In the configuration shown in FIG. 7, the bore 66 is defined in the male portion 28 of the first member 26.

As best shown in FIGS. 4-7, the bore 66 is confined at one end by a ledge 68 extending into the bore 66 and is confined on the other end by a retaining segment 70 extending into the bore 66. The ledge 68 and the retaining segment 70 are spaced from each other axially along the bore 66 and are fixed relative to each other axially along the bore 66. As set forth further below and as shown in the Figures, the one of the first and second members 26, 30 that defines the bore 66 can include a bushing 72 having the ledge 68 and the retaining segment 70. However, it should be appreciated that the ledge 68 and/or retaining segment 70 can be integral with the one of the first and second members 26, 30 that defines the bore 66, i.e., formed as a single part, such as by casting, molding, machining from a single part, etc.

A retainer is coupled to the bearing mechanism. As shown in the Figures, the retainer is further defined as a retaining pin 74 that extends from the bearing mechanism 42. However, it should be appreciated that the particular configuration of the retaining pin 74 shown in the Figures is exemplary and the retainer could be any type of retainer.

The retaining pin 74 has a body 76 fixed to the cage 44 of the bearing mechanism 42. The retaining pin 74 is typically coupled to the cage 44 by way of a fastener such as a flat head screw or the like. In such a configuration, the fastener threadably engages a threaded bore (not shown) in the retaining pin 74 through the chamfered bore 64.

A protrusion 78 extends from the retaining pin 74 and is spaced from the bearing mechanism 42 along the body 76 of the retaining pin 74. The protrusion 78 extends laterally from the body 76 of the retaining pin 74, i.e., transverse to the axis of the body 76. Typically, the body 76 of the retaining pin 74 and the protrusion 78 are integral. The protrusion 78 typically extends circumferentially about the retaining pin 74. For example, as shown in the Figures, the protrusion 78 is an annular ring that extends completely around the circumference of the body 76 of the retaining pin 74. However, it should be appreciated that the protrusion 78 need not extend completely around the circumference of the body 76 and can extend around only a portion/portions of the circumference of the body 76 without departing from the nature of the present invention.

A resilient member 80 is disposed in the bore 66 to resiliently support the bearing mechanism 42 between the first and second positions. The resilient member 80 is typically a coil spring disposed about the retaining pin 74. However, it should be appreciated that the resilient member 80 can be of any type without departing from the nature of the present invention. The resilient member 80 may be made from any sort of material, for example, metal such as steel or a polymer such as urethane. The resilient member 80 may also comprise a positive locating device operating by friction.

The resilient member 80 is retained by one of the first and second members 26, 30. In other words, in the configuration shown in FIGS. 1-6 and 8-10, the resilient member 80 is retained by the second member 30 and in FIG. 7 the resilient member 80 is retained by the first member 26. The resilient member 80 is retained in the bore 66 between the ledge 68 and the retaining segment 70 and extends along the bore 66 between the retaining pin 74, specifically the protrusion 78 of the retaining pin 74, and the retaining segment 70. Typically, the resilient member 80 receives an end of the body 76 that extends beyond the protrusion 78.

The resilient member 80 and the protrusion 78 of the retaining pin 74 are generally enclosed in the bore 66. In this configuration, the resilient member 80 and the retaining pin 74 are protected from dirt, debris, etc., and are also protected from any component that may inadvertently impact the positioning device 20. In addition, the positioning device 20 is compact because the resilient member 80 and the protrusion 78 of the retaining pin 74 are retained in the bore 66.

As set forth above, the one of the first and second members 26, 30 that defines the bore 66 can include the bushing 72, which is hollow and engaged with the one of the first and second members 26, 30 that defines the bore 66. The bushing 72 includes the ledge 68 and the retaining segment 70 such that the resilient member 80 is retained within the bushing 72. Typically, the bushing 72 includes a cylindrical body 82 and the ledge 68 is integral with the cylindrical body 82. The retaining segment 70 typically comprises a snap ring that engages a groove in the cylindrical body 82. The bushing 72 can be attached to first or second member 30 in any fashion without departing from the nature of the present invention.

Figure 6:
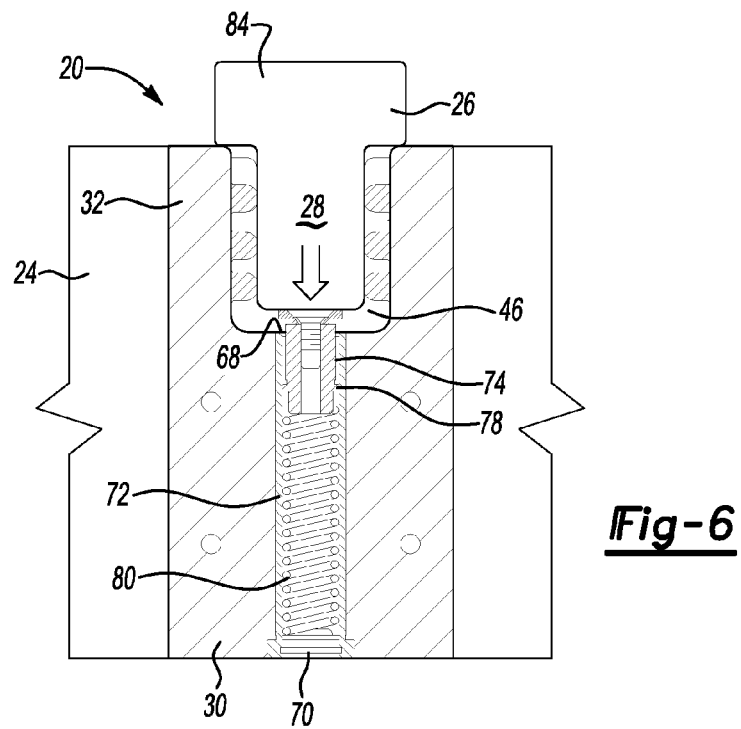
FIG. 6 is a partially cut-away elevational view of the positioning device with the bearing mechanism in the second position.
Figure 7:
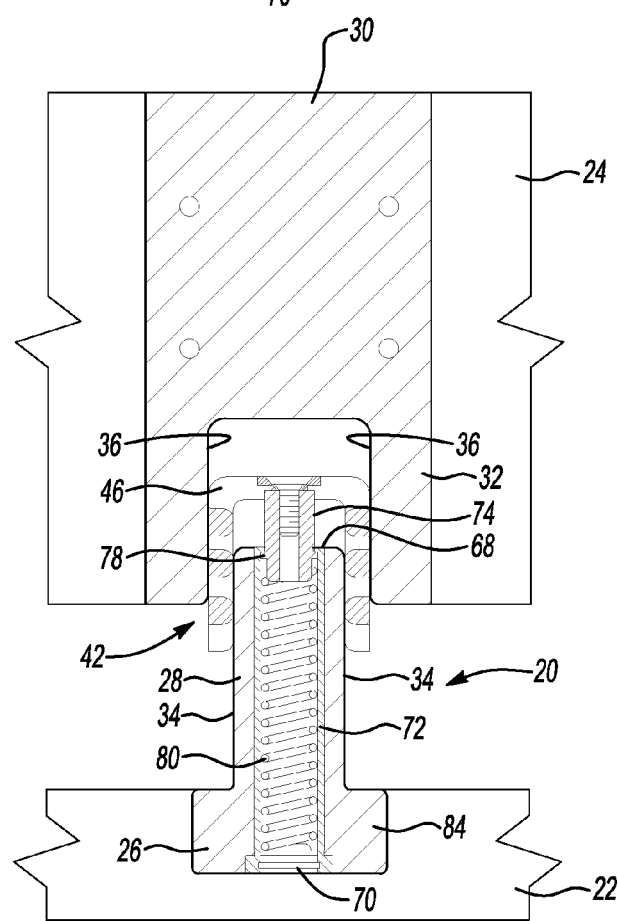
FIG. 7 is an elevational view of an another configuration of the positioning device.

Referring to FIGS. 4-6, operation of the positioning device 20 is illustrated. As shown, the male portion 28 of the first member 26 mates with the female portion 32 of the second member 30 when closing the mold halves 22, 24 together. When this occurs, the bearing mechanism 42 is sandwiched between the members 26, 30, thereby moving the bearing mechanism 42 between the first and second positions. The first and second positions are represented in FIGS. 4 and 6, respectively. FIG. 5 indicates that the bearing mechanism 42 may move slightly relative to the second member 30 prior to mating contact with the male portion 28. In other instances, however, the bearing mechanism 42 may remain stationary relative to the second member 30 until engaged by the male portion 28. In either instance, when the bearing mechanism 42 moves from the first position to the second position, the resilient member 80 is compressed as the retaining pin 74 slides downwardly within the first bore 66.

The male portion 28 of the first member 26 slides into the bearing mechanism 42 along the alignment axis A and between the needle bearings 56, 58, 60, 62 when the first and second members 26, 30 mate together. This is represented by arrows on the male portion 28 in FIGS. 5 and 6. As the members 26, 30 mate and sandwich the bearing mechanism 42 therebetween, the needle bearings 56, 58, 60, 62 roll along the bearing surfaces 34, 36 of the male and female portions 28, 32. This action minimizes wear along the bearing surfaces 34, 36. At the same time, the needle bearings 56, 58, 60, 62 snugly fit between the bearing surfaces 34, 36 to minimize the magnitude of misalignment between the members 26, 30 and, consequently, the mold halves 22, 24. When the mold halves 22, 24 are opened, i.e., the members 26, 30 are separated, the bearing mechanism 42 is released back to the first position.

Figure 8:
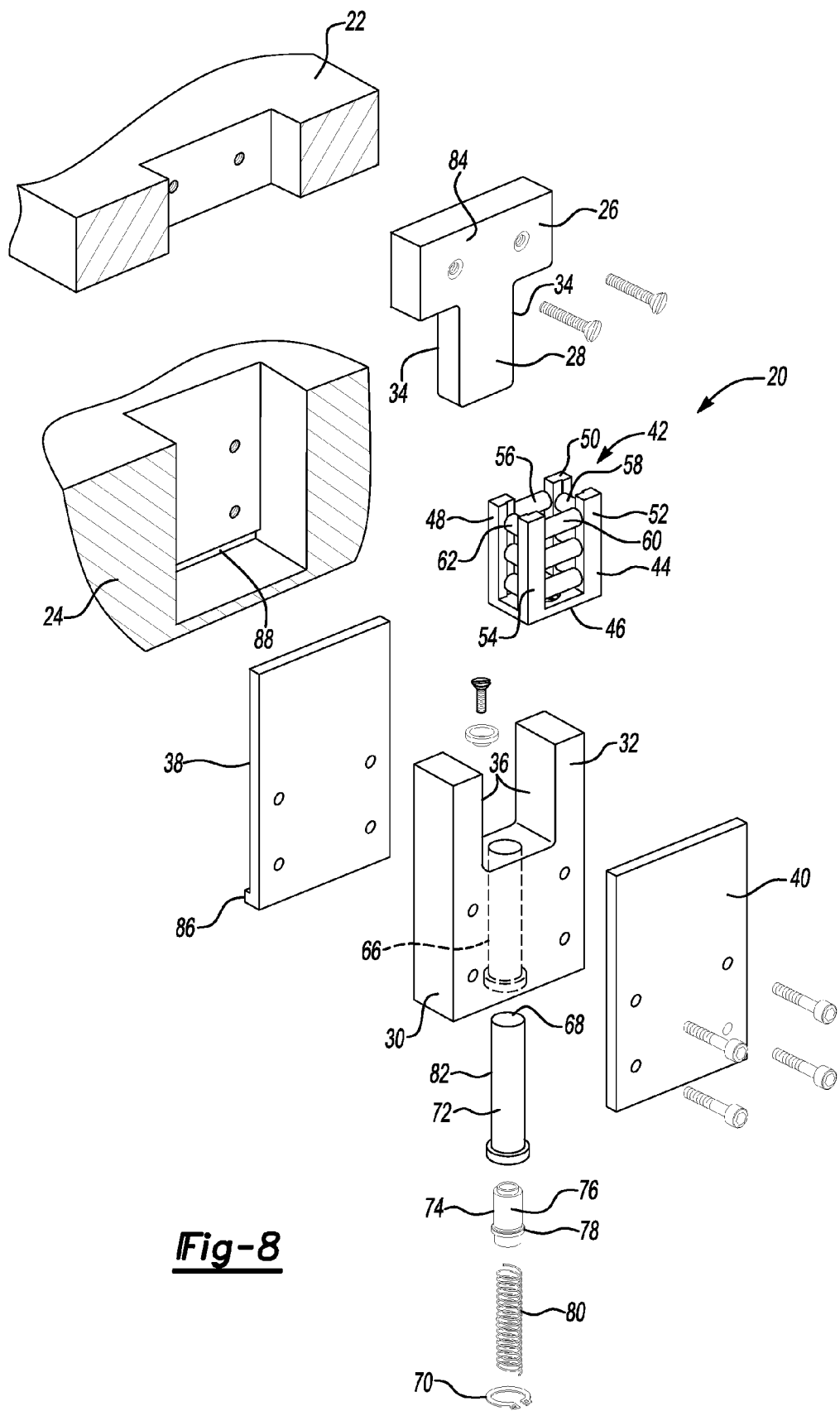
FIG. 8 is an elevational view of a first embodiment of the positioning device.

The retaining pin 74 is retained between the ledge 68 and the resilient member 80 for reacting against the resilient member 80 as the bearing mechanism 42 moves between the first and second positions. As shown in FIG. 8, when the male portion 28 is disengaged from the female portion 32, the resilient member 80 urges the retaining pin 74 to extend from the bore 66 beyond the ledge 68 and the bearing mechanism 42 is in the first position. In the first position, the protrusion 78 engages the ledge 68 to prevent the retaining pin 74 from entirely exiting the bore 66.

As shown in FIG. 5, the male portion 28 forces the bearing mechanism 42 toward the female portion 32 from the first position toward the second position as the male portion 28 moves along the alignment axis A toward the female portion 32. During this movement, the bearing mechanism 42 forces the retaining pin 74 to retract into the bore 66 while the protrusion 78 of the retaining pin 74 compresses the resilient member 80.

As shown in FIG. 6, as the male portion 28 continues to force the bearing mechanism 42 toward the female portion 32 to the second position, the protrusion 78 further compresses the resilient member 80. In the second position, the bottom wall 46 of the cage 44 typically contacts the female portion 32. As the male portion 28 is withdrawn along the alignment axis A, the resilient member 80 urges the retaining pin 74 to extend from the bore 66 beyond the ledge 68 and the bearing mechanism 42 moves toward the first position.

In the configuration shown in FIGS. 1, 2, and 4-7, the positioning device 20 is typically referred to in industry as cavity and core locks. The positioning device 20 can be used in place of traditional parting line blocks, or can be installed directly into a cavity and core, slide faces, or anything in a mold that requires very close alignment. The positioning device 20 of FIGS. 1, 2, and 4-7 is typically used inside the mold or on internal parts and, as set forth above, aligns the mold halves 22, 24 in all directions.

Referring still to the configuration shown in FIGS. 1, 2, and 4-7, the first member 26 has a unitary body having a main body portion 84 with the male portion 28 extending therefrom to form a generally T-shape. The main body portion 84 defines at least one counterbore parallel to the alignment axis A to receive a fastener for mounting the first member 26 to the first mold half 22. It should be appreciated that the counterbore through the first member 26 can be along the alignment axis A, i.e., through the male portion 28, or can be spaced from the alignment axis A, e.g., through the main body portion 84. The second member 30 comprises a unitary body having a generally U-shape and presenting a foot 86 for interlocking with a recess 88 in the second mold half 24.

It should be appreciated that the counterbore and corresponding fastener through the first member 26 and the foot 86 of the second member 30 and corresponding recess 88 are shown in FIGS. 1, 2, and 4-7 for exemplary purposes. The first and second member 30 can be mounted to the first and second mold halves 22, 24, respectively, in any fashion without departing from the nature of the present invention. For example, in addition to or in the alternative to the foot 86, the second member 30 can include a counterbore to receive a fastener for mounting the second member 30 to the second mold half 24. Likewise, in addition to or in the alternative to the counterbore and corresponding fastener through the first member 26, the first member 26 can include a foot for interlocking with a recess in the first mold half 22.

In the configuration shown in FIG. 8, the first and second members 26, 30 are typically referred to in industry as first and second side locks. The first and second side locks are typically disposed on the outside of the mold. Again in this configuration, the first member 26 has a unitary body having a main body portion 84 with the male portion 28 extending therefrom to form a generally T-shape. Again for example, the main body portion 84 defines at least one counterbore perpendicular to the alignment axis A to a receive fastener for mounting the first member 26 to the first mold half. The second member 30 comprises a unitary body having a generally U-shape and defines at least one counterbore perpendicular to the alignment axis A to receive a fastener for mounting the second member 30 to the second mold half 24.

Figure 9:
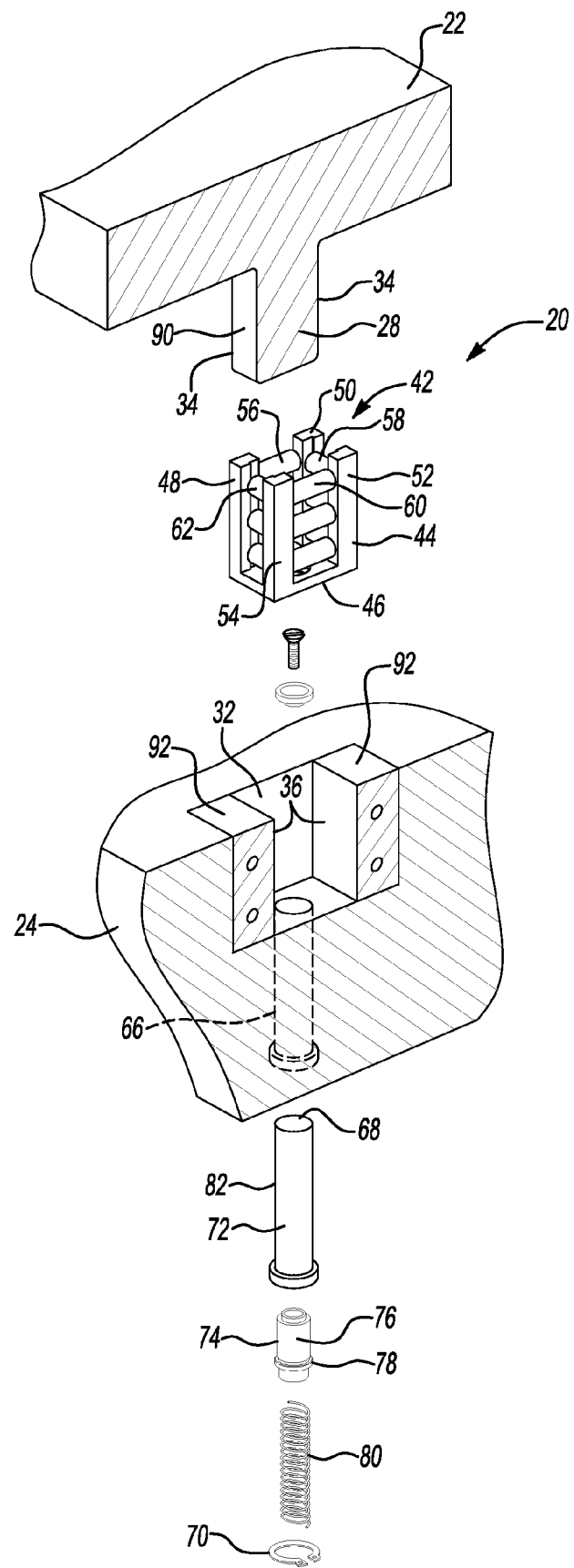
FIG. 9 is an elevational view of a second embodiment of the positioning device.
Figure 10:
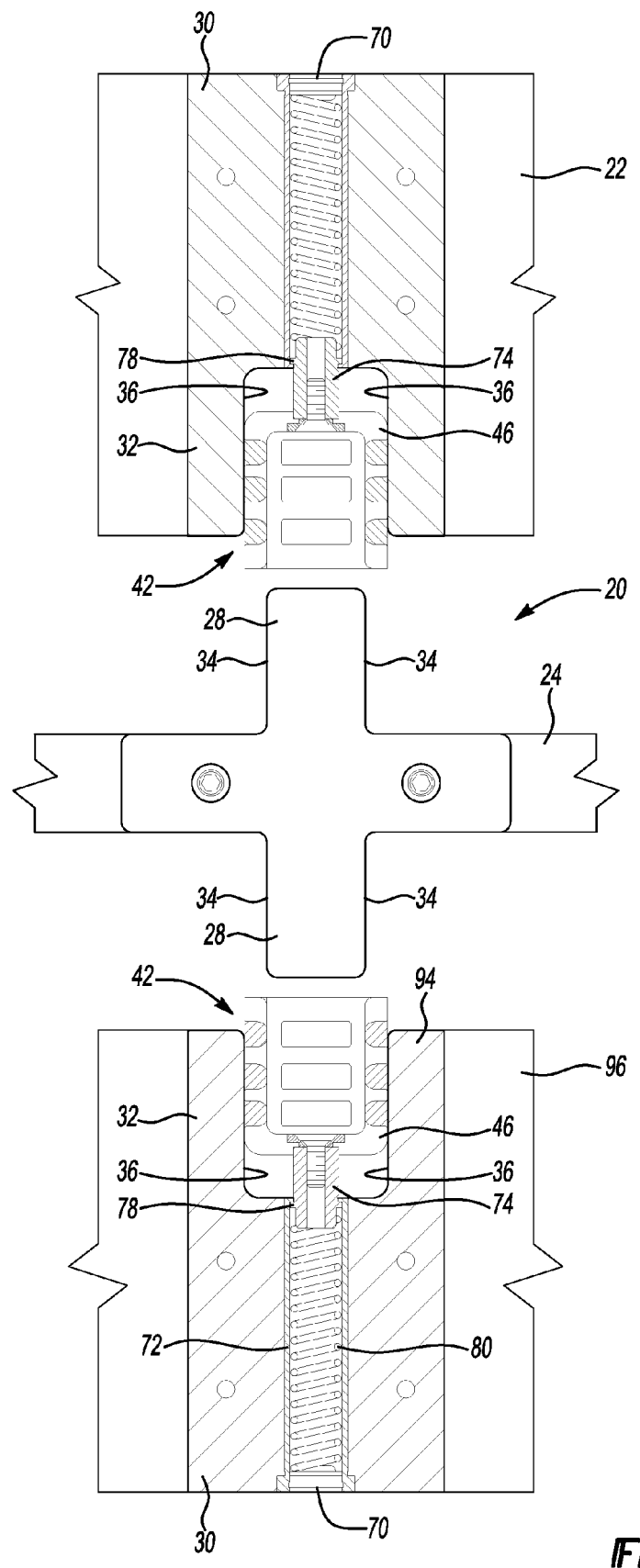
FIG. 10 is an elevational view of a third embodiment of the positioning device.

In the configuration shown in FIG. 9, the first member 26 is further defined as a top guide block 90 and the second member 30 is further defined as a pair of bottom guide blocks 92 spaced from one another to define the female portion 32 therebetween. In this embodiment, the resilient member 80 is positioned in the second mold half 24 to resiliently support the cage 44 when mating the top guide block 90 with the pair of bottom guide blocks 92. Again for example, each of the blocks 90, 92 define at least one counterbore (not shown) parallel to the alignment axis A to receive a fastener for mounting the blocks 90, 92 to the first and second mold halves 22, 24. Of course, as with all other embodiments, the cage 44 could be supported by the male portion 28 of the top guide block 90.

In the configuration shown in FIG. 10, a third member 94 is added and the first, second, and third members 26, 30, 94 are further defined as first, second, and third x-type side locks. The third member 94 defines another female portion 32 and the first side lock includes another male portion 28 for mating with the female portion 32 of the third member 94. Another bearing mechanism 42, identical to the first, is interposed between the first and third members 26, 94.

In the configuration of FIG. 10, the first member 26 comprises a unitary body having a main body portion 84 with the male portions 28 extending therefrom to form a generally cross shape. The main body portion 84 defines at least one counterbore (not shown) perpendicular to the alignment axis A to receive a fastener for mounting the first member 26 to the first mold half 22. The second and third members 30, 94 each comprise a unitary body having a generally U-shape and defining at least one counterbore (not shown) perpendicular to the alignment axis A to receive a fastener for mounting the second member 30 to the second mold half 24 and mounting the third member 94 to a third mold half 96. The first and second members 26, 30 align and guide the first and second mold halves 22, 24 together and the first and third members 30, 94 align and guide the first and third mold halves 22, 24 together.

In the configurations illustrated in FIGS. 8-10, the bearing mechanisms 42 (e.g., cages 44, retaining pins 74, and fasteners) are substantially identical in configuration and positioning as the preferred embodiment of FIGS. 1-7.

Figure 11:
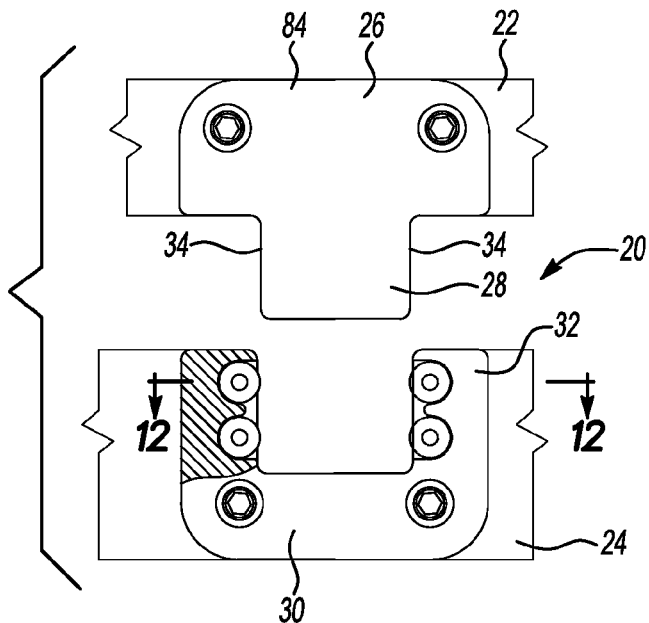
FIG. 11 is an elevational view of an alternative bearing mechanism embodied in first and second members.
Figure 12:
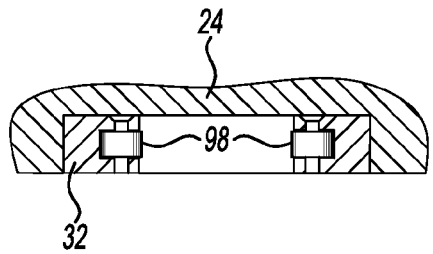
FIG. 12 is a partially cut-away top view of the alternative bearing mechanism.
Figure 13:
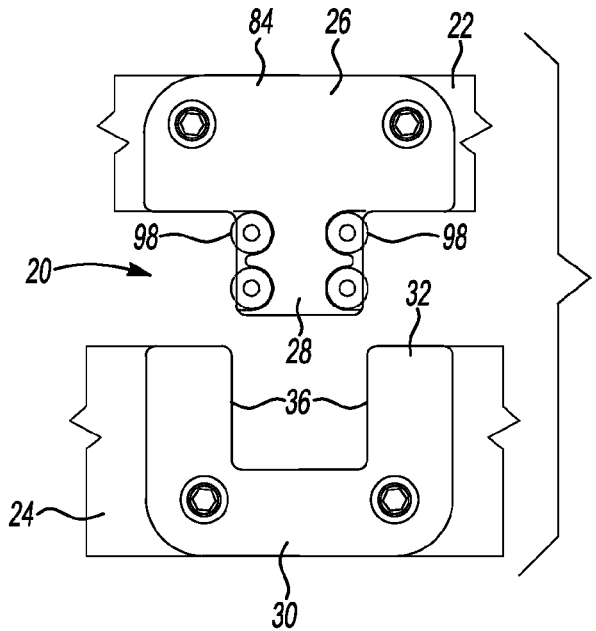
FIG. 13 is an elevational view of another alternative bearing mechanism embodied in the first and second members.

Alternative bearing mechanisms are illustrated in two alternative embodiments in FIGS. 11-13. In the embodiment of FIG. 11, the second member 30 defines semi-circular recesses. In the embodiment of FIG. 13, the first member 26 defines the semi-circular recesses. The bearing mechanisms comprise a plurality of roller bearings 98 rotatably supported within the semi-circular recesses. As illustrated in FIGS. 11 and 12 the roller bearings 98 are rotatably supported in the semi-circular recesses of the second member 30. Alternatively, in FIG. 13, the roller bearings 98 are rotatably supported within the semi-circular recesses in the first member 26. Each of the roller bearings 98 defines a bore (not shown) therethrough for receiving a support pin. Each support pin provides for rotation of the roller bearings 98 about an axis. In the embodiment of FIGS. 11 and 12, the roller bearings 98 co-act with a female portion 32 to reduce friction along first bearing surfaces of a male portion 28. In the embodiment of FIG. 13, the roller bearings 98 co-act with the male portion 28 to reduce friction along second bearing surfaces of the female portion 32.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A positioning device for aligning and guiding first and second mold halves together, said positioning device comprising:
a first member defining an alignment axis and having a male portion;
a second member separable from said first member and defining a female portion for mating with said male portion along said alignment axis;
a bearing mechanism coupled to at least one of said male and female portions for reducing friction when said male and female portions mate and said bearing mechanism moves between first and second positions relative to at least one of said members;
a resilient member retained by one of said first and second members for resiliently supporting said bearing mechanism between said first and second positions; and
a retainer coupled to said bearing mechanism and retained between said one of said first and second members and said resilient member for reacting against said resilient member as said bearing mechanism moves between the first and second positions.

2. The positioning device as set forth in claim 1 wherein one of said first and second members define a bore and said resilient member is disposed in said bore.

3. The positioning device as set forth in claim 2 wherein said one of said first and second members has a ledge extending into said bore for retaining said resilient member in said bore.

4. The positioning device as set forth in claim 3 wherein said retainer is retained in said bore between said ledge and said resilient member.

5. The positioning device as set forth in claim 3 further including a retaining segment extending into said bore and spaced from said ledge axially along said bore for retaining said resilient member in said bore.

6. The positioning device as set forth in claim 5 wherein said resilient member is retained in said bore between said ledge and said retaining segment.

7. The positioning device as set forth in claim 5 wherein said resilient member extends along said bore between said retainer and said retaining segment.

8. The positioning device as set forth in claim 5 wherein said ledge and said retaining segment are fixed relative to each other.

9. The positioning device as set forth in claim 1 further including a protrusion extending from said retainer for engaging said resilient member and said one of said first and second members.

10. The positioning device as set forth in claim 5 wherein said protrusion extends circumferentially about said retainer.

11. The positioning device as set forth in claim 5 wherein said protrusion is spaced from said bearing mechanism along said retainer.

12. The positioning device as set forth in claim 1 wherein said one of said first and second members includes a bushing that is hollow and engaged with said one of said first and second members.

13. The positioning device as set forth in claim 12 wherein said resilient member is retained within said bushing.

14. The positioning device as set forth in claim 13 wherein said bushing includes a ledge extending inwardly for retaining said resilient member within said housing.

15. The positioning device as set forth in claim 1 wherein said resilient member is further defined as a coil spring.

16. The positioning device as set forth in claim 1 wherein said bearing mechanism includes a plurality of columns and a plurality of needle bearings supported by said columns, said columns and said needle bearings defining a cavity surrounded by said columns and said needle bearings.

17. A positioning device for aligning and guiding first and second mold halves together, said positioning device comprising:
a first member defining an alignment axis and having a male portion;
a second member separable from said first member and defining a female portion for mating with said male portion along said alignment axis;
a bearing mechanism coupled to at least one of said first and second members for reducing friction when said male and female portions mate and said bearing mechanism moves between first and second positions relative to at least one of said members;
one of said first and second members defining a bore;
a resilient member disposed in said bore for resiliently supporting said bearing mechanism between said first and second positions;
a ledge extending into said bore for retaining said resilient member in said bore; and
a retainer extending from said bearing mechanism and retained in said bore between said ledge and said resilient member for reacting against said resilient member as said bearing mechanism moves between the first and second positions.

18. The positioning device as set forth in claim 17 further including a protrusion extending from said retainer for engaging said resilient member and said ledge.

19. The positioning device as set forth in claim 18 wherein said protrusion extends circumferentially about said retainer.

20. The positioning device as set forth in claim 18 wherein said protrusion is spaced from said bearing mechanism along said retainer.

21. The positioning device as set forth in claim 17 a retaining segment extending into said bore and spaced from said ledge axially along said bore for retaining said resilient member in said bore.

22. The positioning device as set forth in claim 21 wherein said resilient member is retained in said bore between said ledge and said retaining segment.

23. The positioning device as set forth in claim 21 wherein said resilient member extends along said bore between said retainer and said retaining segment.

24. The positioning device as set forth in claim 21 wherein said ledge and said retaining segment are fixed relative to each other.

25. The positioning device as set forth in claim 17 further including a bushing that is hollow and disposed in said bore.

26. The positioning device as set forth in claim 25 wherein said resilient member is retained within said bushing.

27. The positioning device as set forth in claim 25 wherein said ledge extends from said bushing.

28. The positioning device as set forth in claim 25 wherein said bushing is fixed to said one of said first and second members.

29. The positioning device as set forth in claim 17 wherein said resilient member is further defined as a coil spring.

30. The positioning device as set forth in claim 17 wherein said bearing mechanism includes a plurality of columns and a plurality of needle bearings supported by said columns said columns and said needle bearings defining a cavity surrounded by said columns and said needle bearings.

31. A positioning device for aligning and guiding first and second mold halves together, said positioning device comprising:

- a first member defining an alignment axis and having a male portion;
- a second member separable from said first member and defining a female portion for mating with said male portion along said alignment axis to align said first and second mold halves together;
- said male portion presenting a first bearing surface and said female portion presenting a second bearing surface;
- a bearing mechanism for reducing friction along said bearing surfaces when mating said members together along said alignment axis as said bearing mechanism moves between first and second positions relative to at least one of said members;
- one of said first and second members defining a bore;
- a resilient member disposed in said bore for resiliently supporting said bearing mechanism between said first and second positions;
- a ledge extending into said bore for retaining said resilient member in said bore;
- a retaining pin extending from said bearing mechanism and retained in said bore between said ledge and said resilient member for reacting against said resilient member as said bearing mechanism moves between the first and second positions;
- a protrusion extending from said retaining pin spaced from said bearing mechanism along said retaining pin for engaging said resilient member and said ledge; and
- a retaining segment extending into said bore and spaced from said ledge axially along said bore wherein said resilient member is retained in said bore between said ledge and said retaining segment.

32. The positioning device as set forth in claim 31 wherein said bearing mechanism includes a plurality of columns and a plurality of needle bearings supported by said columns said columns and said needle bearings defining a cavity surrounded by said columns and said needle bearings.

* * * * *